(12) United States Patent
Terada et al.

(10) Patent No.: US 9,690,046 B2
(45) Date of Patent: Jun. 27, 2017

(54) OPTICAL CIRCUIT BOARD AND METHOD FOR PRODUCING THE SAME

(71) Applicant: KYOCERA Circuit Solutions, Inc., Kyoto (JP)

(72) Inventors: Kenji Terada, Moriyama (JP); Akifumi Sagara, Yasu (JP)

(73) Assignee: KYOCERA CORPORATION, Kyoto-Shi, Kyoto (JP)

( * ) Notice: Subject to any disclaimer, the term of this patent is extended or adjusted under 35 U.S.C. 154(b) by 0 days.

(21) Appl. No.: 15/048,017

(22) Filed: Feb. 19, 2016

(65) Prior Publication Data
US 2016/0245997 A1    Aug. 25, 2016

(30) Foreign Application Priority Data

Feb. 23, 2015 (JP) .................................. 2015-032781

(51) Int. Cl.
| | |
|---|---|
| *G02B 6/12* | (2006.01) |
| *G02B 6/132* | (2006.01) |
| *G02B 6/42* | (2006.01) |

(52) U.S. Cl.
CPC ........... *G02B 6/132* (2013.01); *G02B 6/4214* (2013.01); *G02B 2006/12085* (2013.01); *G02B 2006/12104* (2013.01)

(58) Field of Classification Search
CPC  G02B 6/122; G02B 6/13; G02B 2006/12085; G02B 2006/12104
USPC .......................................................... 385/14
See application file for complete search history.

(56) References Cited

U.S. PATENT DOCUMENTS

| | | | | |
|---|---|---|---|---|
| 6,438,281 B1* | 8/2002 | Tsukamoto | ............ | G02B 6/138 385/14 |
| 6,706,546 B2* | 3/2004 | Inao | ......................... | G02B 6/10 257/E23.01 |
| 7,070,207 B2* | 7/2006 | Asai | .................... | G02B 6/12002 257/113 |
| 7,376,295 B2* | 5/2008 | Lee | .................... | G02B 6/12002 385/14 |
| 7,693,382 B2* | 4/2010 | Asai | .................... | G02B 6/12002 257/40 |
| 8,737,794 B2* | 5/2014 | Yamamoto | ....... | B29D 11/00663 385/130 |

(Continued)

FOREIGN PATENT DOCUMENTS

JP        2006-330066 A     12/2006

*Primary Examiner* — Ryan Lepisto
*Assistant Examiner* — Guy Anderson
(74) *Attorney, Agent, or Firm* — Volpe and Koenig, P.C.

(57) ABSTRACT

The optical circuit board includes a wiring board including a plurality of laminated insulating layers, and a wiring conductor disposed between the insulating layers; an optical waveguide including a lower clad layer, an upper clad layer and a core sandwiched between the lower clad layer and the upper clad layer, disposed on an upper surface of the wiring board, and extending in one direction; a reflection surface including an inner surface of a groove formed in a part of the core of the optical waveguide, and being perpendicular to an extending direction in a plane view and having a predetermined angle with respect to the upper surface in a cross sectional view; and a metal layer disposed on an upper surface of the insulating layer on the upper side than the wiring conductor of the wiring board, and set as a bottom surface of the groove.

2 Claims, 5 Drawing Sheets

(56) References Cited

U.S. PATENT DOCUMENTS

| | | | | |
|---|---|---|---|---|
| 8,768,114 B2* | 7/2014 | Tsujita | .................... | G02B 6/43 216/17 |
| 2005/0185880 A1* | 8/2005 | Asai | .................. | G02B 6/12002 385/14 |
| 2006/0263003 A1* | 11/2006 | Asai | ..................... | G02B 6/4204 385/14 |
| 2008/0118199 A1* | 5/2008 | Asai | ..................... | G02B 6/4204 385/14 |
| 2008/0317402 A1* | 12/2008 | Kodama | ............ | G02B 6/12002 385/14 |
| 2009/0028497 A1* | 1/2009 | Kodama | .................. | G02B 6/43 385/14 |
| 2009/0212651 A1* | 8/2009 | Suginohara | ........ | G11B 19/2009 310/156.01 |
| 2010/0061679 A1* | 3/2010 | Hayashi | ................ | G02B 6/138 385/14 |
| 2010/0232744 A1* | 9/2010 | Asai | ........................ | G02B 6/43 385/14 |
| 2010/0323297 A1* | 12/2010 | Yanagisawa | ............. | G02B 6/43 430/315 |
| 2012/0213470 A1* | 8/2012 | Matsuoka | ................ | G02B 6/43 385/14 |
| 2013/0330049 A1* | 12/2013 | Yanagisawa | ............. | G02B 6/42 385/88 |
| 2016/0047978 A1* | 2/2016 | Kubota | ................ | G02B 6/4214 385/31 |

* cited by examiner

OPTICAL CIRCUIT BOARD AND METHOD FOR PRODUCING THE SAME

BACKGROUND OF THE INVENTION

1. Technical Field

The present invention relates to an optical circuit board including a reflection surface for redirecting the optical signal and a method for producing the same.

2. Background

The conventional optical circuit board will be described with reference to FIG. 3. The conventional optical circuit board B includes a wiring board 20, and an optical waveguide forming portion 21 as shown in FIG. 3.

The wiring board 20 includes a lower insulating layer 22a and an upper insulating layer 22b. A connection hole 23 is formed in each of the insulating layers 22a and 22b. A lower-layer wiring conductor 24a is formed on the upper surface of the lower insulating layer 22a and in the connection hole 23. An upper-layer wiring conductor 24b is formed on the upper surface of the upper insulating layer 22b and in the connection hole 23. An external connection pad 25 is formed on the lower surface of the lower insulating layer 22a.

The optical waveguide forming portion 21 is formed on the wiring board 20. An optical waveguide 26 and an electronic component connection pad 27 are formed in the optical waveguide forming portion 21.

The optical waveguide 26 is formed by a lower clad layer 26a, a core 26b, and an upper clad layer 26c. An optical signal is transmitted to the optical waveguide 26.

The electronic component connection pad 27 is formed on the upper surface of the optical waveguide 26 (upper clad layer 26c). An electronic component (not shown) is mounted on the electronic component connection pad 27. Optical signals are transferred between the electronic component and the optical waveguide 26.

A connection hole 28 is formed so as to penetrate the optical waveguide forming portion 21 in the optical waveguide forming portion 21. A connection conductor 28a is deposited in the connection hole 28. The electronic component connection pad 27 and the upper-layer wiring conductor 24b are connected through the connection conductor 28a.

The lower clad layer 26a and the upper clad layer 26c constituting the optical waveguide forming portion 21 are solid insulating layers. The core 26b is a thin strip having a rectangular cross-section. The lower clad layer 26a and the upper clad layer 26c are in close contact with the surface of the core 26b, and surround the core 26b.

The core 26b has a reflection surface M at one end. The reflection surface M includes an inner surface of a groove being perpendicular to the extending direction of the core 26b in a plane view and having a predetermined angle with respect to the upper surface in a cross sectional view. The transfer of optical signals is performed between the optical waveguide 26 and the electronic component through the reflection surface M.

Next, the method for producing the conventional optical circuit board will be described with reference to the principal part enlarged views shown in FIGS. 4A to 4I. The same members as in FIG. 3 will be denoted by the same reference numerals and will be described.

First, as shown in FIG. 4A, the lower insulating layer 22a on the upper surface of which the lower-layer wiring conductor 24a is deposited, and on the lower surface of which the external connection pad 25 is deposited is prepared.

Next, as shown in FIG. 4B, the upper insulating layer 22b is laminated on the upper surface of the lower insulating layer 22a, and the connection hole 23 having the lower-layer wiring conductor 24a as the bottom surface is formed.

Next, as shown in FIG. 4C, the upper-layer wiring conductor 24b is deposited on the upper surface of the upper insulating layer 22b and in the connection hole 23, whereby the wiring board 20 is formed.

Next, as shown in FIG. 4D, the lower clad layer 26a is formed on the upper surface of the wiring board 20.

Next, as shown in FIG. 4E, the core 26b is formed on the upper surface of the lower clad layer 26a.

Next, as shown in FIG. 4F, the upper clad layer 26c is formed on the upper surface of the core 26b, whereby the optical waveguide 26 is formed.

Next, as shown in FIG. 4G, the connection hole 28 exposing a part of the upper-layer wiring conductor 24b as the bottom surface is formed in the optical waveguide 26.

Next, as shown in FIG. 4H, the connection conductor 28a is deposited in the connection hole 28, and the electronic component connection pad 27 is formed on the upper surface of the upper clad layer 26c.

Lastly, as shown in FIG. 4I, a laser beam is irradiated obliquely from above the optical waveguide 26 to divide the core 26b, and the reflection surface M including an inner surface of the groove being perpendicular to the extending direction of the core 26b and having a predetermined angle with respect to the upper surface of the wiring board 20 is formed, whereby the conventional optical circuit board B is formed as shown in FIG. 3.

For example, Japanese Unexamined Patent Application Publication No. 2006-330066 discloses a high refractive index core layer having a cross-section of substantially rectangular shape, a low refractive index upper clad layer covering the high refractive index core layer, and a groove forming the optical reflection surface for propagating the optical signal, propagating through the high refractive index core layer, through the high refractive index core layer by bending the optical signal into an upward or downward direction at a right angle, so that the optical signal propagating through the core layer can be bent at a right angle. The $CO_2$ laser beam is irradiated at the high refractive index core layer from above the low refractive index upper clad layer, and therefore a groove having an inclination of approximately 45° with respect to the high refractive index core layer and being at least wider than the width of the high refractive index core layer is formed. The optical reflection surface is constituted by the flat portion of the groove wall.

By the way, in recent years, as the miniaturization and high functionality of electronic devices typified by portable communication devices and music players is advanced, the optical circuit boards mounted on these electronic devices are also required in miniaturization and high functionality. For this reason, for the wiring conductor of the wiring board constituting the optical circuit board, a fine wiring conductor is made so as to be formed in high density.

However, when the reflection surface M is formed by the method for producing the conventional optical circuit board B, there are cases where the laser beam irradiated obliquely from above penetrates the upper insulating layer 22b and reaches the fine lower-layer wiring conductor 24a formed in high density to damage. As a result, there is a problem that the electrical signal does not easily propagate to the lower-layer wiring conductor 24a, and that the electronic component does not operate stably.

SUMMARY

The object according to the embodiments of the present invention is to provide an optical circuit board configured to prevent damaging the wiring conductor, and to allow the electronic component to operate stably, and a method for producing the same, by forming a metal layer configured to prevent the laser beam, used at the time of forming the reflection surface, from reaching the wiring conductor formed on the wiring board.

The optical circuit board according to the embodiments of the present invention includes the following components:

a wiring board including a plurality of laminated insulating layers, and a wiring conductor disposed between the insulating layers;

an optical waveguide including a lower clad layer, an upper clad layer and a core sandwiched between the lower clad layer and the upper clad layer, disposed on an upper surface of the wiring board, and extending in one direction;

a reflection surface including an inner surface of a groove formed in a part of the core of the optical waveguide, and being perpendicular to an extending direction in a plane view and having a predetermined angle with respect to the upper surface in a cross sectional view; and a metal layer disposed on an upper surface of the insulating layer on the upper side than the wiring conductor of the wiring board, and set as a bottom surface of the groove.

The method for producing an optical circuit board according to the embodiments of the present invention includes: disposing an optical waveguide sandwiching a core between a lower clad layer and an upper clad layer on an upper surface of a wiring board including a wiring conductor between a plurality of laminated insulating layers so as to extend along the upper surface; dividing the core by a laser beam irradiated obliquely from above the optical waveguide; forming a reflection surface including an inner surface of a groove being perpendicular to an extending direction in a plane view and having a predetermined angle with respect to the upper surface in a cross sectional view in a part of the core; and in a region where an irradiating axis of the laser beam and an upper surface of the insulating layer on an upper side of the wiring conductor intersect, forming a metal layer configured to prevent the laser beam from reaching a lower side of the upper surface of the insulating layer on the upper side of the wiring conductor.

DETAILED DESCRIPTION

First, an optical circuit board A according to an embodiment of the present invention will be described in detail with reference to FIG. 1A.

Figure 1A:
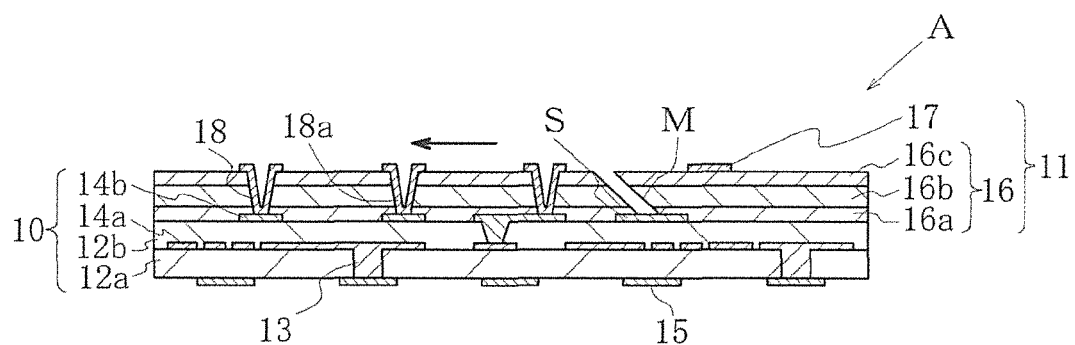
FIG. 1A is a schematic cross-sectional view showing an optical circuit board according to an embodiment of the present invention.

As shown in FIG. 1A, the optical circuit board A of the present embodiment includes a wiring board 10, and an optical waveguide forming portion 11.

The wiring board 10 includes a lower insulating layer 12a and an upper insulating layer 12b. A connection hole 13 is formed in both insulating layers 12a and 12b. A lower-layer wiring conductor 14a is formed on the upper surface of the lower insulating layer 12a and in the connection hole 13. An upper-layer wiring conductor 14b is formed on the upper surface of the upper insulating layer 12b and in the connection hole 13. A metal layer S for the laser beam cutoff is formed on the upper surface of the upper insulating layer 12b. An external connection pad 15 is formed on the lower surface of the lower insulating layer 12a.

The optical waveguide forming portion 11 is formed on the upper surface of the wiring board 10. An optical waveguide 16 and an electronic component connection pad 17 are formed in the optical waveguide forming portion 11.

The optical waveguide 16 is formed by a lower clad layer 16a, a core 16b, and an upper clad layer 16c. The optical waveguide 16 is formed so as to extend along the upper surface of the wiring board 10. An optical signal is transmitted to the optical waveguide 16.

The electronic component connection pad 17 is formed on the upper surface of the upper clad layer 16c. An electronic component (not shown) is mounted on the electronic component connection pad 17. Optical signals are transferred between the electronic component and the optical waveguide 16.

A connection hole 18 is formed so as to penetrate the optical waveguide forming portion 11 in the optical waveguide forming portion 11. A connection conductor 18a is deposited in the connection hole 18. The electronic component connection pad 17 and the upper-layer wiring conductor 14b are connected through the connection conductor 18a.

The lower clad layer 16a and the upper clad layer 16c constituting the optical waveguide forming portion 11 are solid insulating layers. The core 16b is a thin strip having a rectangular cross-section. The lower clad layer 16a and the upper clad layer 16c are in close contact with the surface of the core 16b, and surround the core 16b.

Figure 1B:
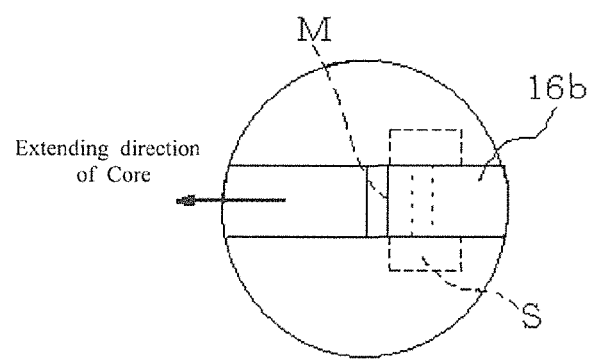
FIG. 1B is a partial plane view showing a core in the optical circuit board shown in FIG. 1A.

The core 16b has a reflection surface M at one end. The reflection surface M includes an inner surface of a groove being perpendicular to the extending direction of the core 16b in a plane view and having a predetermined angle (35 to 50°) with respect to the upper surface in a cross sectional view as shown by the arrows in FIGS. 1A and 1B. The transfer of optical signals is performed between the optical waveguide 16 and the electronic component on the electronic component connection pad 17 through the reflection surface M.

Next, the method for producing the optical circuit board of the present invention will be described in detail with reference to FIGS. 2A to 2I. The same members as in FIGS. 1A and 1B will be denoted by the same reference numerals and will be described.

Figure 2A:
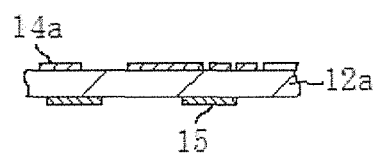
FIGS. 2A to 2I are principal part enlarged cross-sectional views showing a method for producing the optical circuit board according to an embodiment of the present invention.

First, as shown in FIG. 2A, the lower insulating layer 12a on the upper surface of which the lower-layer wiring conductor 14a is deposited, and on the lower surface of which the external connection pad 15 is deposited is prepared.

The lower insulating layer 12a is, for example, formed by the glass cloth being impregnated with an epoxy resin, a bismaleimide triazine resin, and the like and being thermoset. The lower-layer wiring conductor 14a and the external connection pad 15 are, for example, formed of a highly conductive metal such as copper by the well-known plating method.

Figure 2B:
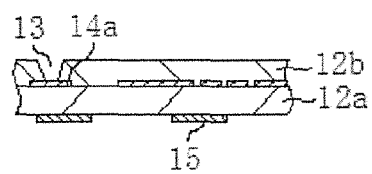

Next, as shown in FIG. 2B, the upper insulating layer 12b is laminated on the upper surface of the lower insulating layer 12a, and the connection hole 13 exposing the lower-layer wiring conductor 14a as the bottom surface is formed.

The upper insulating layer 12b is formed by the insulation sheet, including, for example, bismaleimide triazine resin, polyimide resin, and the like, being deposited on the upper surface of the lower insulating layer 12a in a vacuum state, and subsequently being thermoset. The connection hole 13 is, for example, formed by laser processing.

Figure 2C:
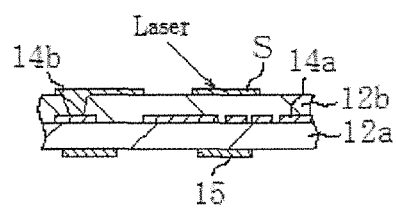

Next, as shown in FIG. 2C, the upper-layer wiring conductor 14b is deposited on the upper surface of the upper insulating layer 12b and in the connection hole 13, and the metal layer S for the laser beam cutoff is deposited in the region where the irradiation axis of the laser beam for forming the reflection surface M described below and the upper surface of the upper insulating layer 12b intersect, whereby the wiring board 10 is formed.

The upper-layer wiring conductor 14b and the metal layer S are, for example, formed of a highly conductive metal such as copper by the well-known plating method. The thickness of the metal layer S is preferably about 10 to 15 µm. When the thickness is less than 10 µm, there are cases where the cutoff of the laser beam is incomplete. When the thickness is larger than 15 µm, there are cases where the slimming down of the optical waveguide 16 is difficult.

Figure 2D:
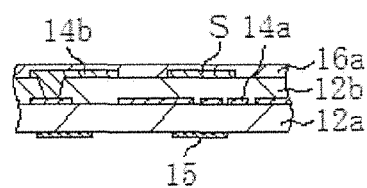

Next, as shown in FIG. 2D, the lower clad layer 16a is formed on the upper surface of the wiring board 10.

The lower clad layer 16a is formed by a photosensitive sheet, including, for example, epoxy resin and polyimide resin, being deposited on the wiring board 10 in a vacuum into a predetermined shape by exposure and development, and subsequently being thermoset. The thickness of the lower clad layer 16a is about 10 to 20 µm.

Figure 2E:
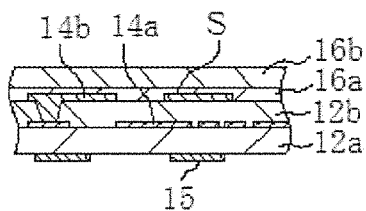

Next, as shown in FIG. 2E, the core 16b is formed on the upper surface of the lower clad layer 16a. The core 16b is formed by a photosensitive sheet, including, for example, epoxy resin and polyimide resin, being deposited on the lower clad layer 16a in a vacuum into a strip shape by exposure and development, and subsequently being thermoset. The refractive index of the resin forming a photosensitive sheet for forming the core 16b, which is larger than the refractive index of the resin forming a photosensitive sheet for forming the lower and upper clad layers 16a and 16c, is used. The thickness of the core 16b is about 30 to 40 µm.

Figure 2F:
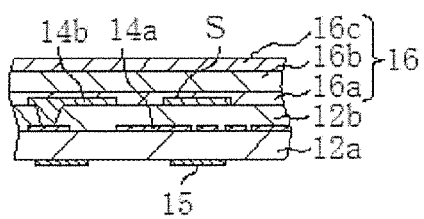

Next, as shown in FIG. 2F, the upper clad layer 16c is formed on the upper surface of the core 16b, whereby the optical waveguide 16 is formed.

The upper clad layer 16c is formed by a photosensitive sheet, including, for example, epoxy resin and polyimide resin, being deposited so as to cover the lower clad layer 16a and the core 16b in a vacuum to be exposed and developed, and subsequently being thermoset. The thickness of the upper clad layer 16c is about 10 to 20 µm.

Figure 2G:
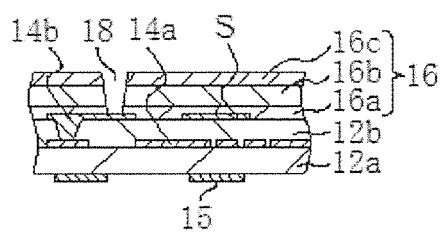

Next, as shown in FIG. 2G, the connection hole 18 exposing a part of the upper-layer wiring conductor 14b as the bottom surface is formed in the optical waveguide 16. The connection hole 18 is formed with the upper-layer wiring conductor 14b as the bottom surface by, for example, laser processing.

Figure 2H:
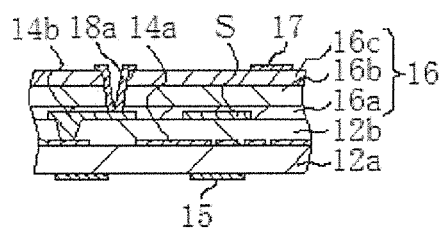

Next, as shown in FIG. 2H, the connection conductor 18a is deposited in the connection hole 18, and the electronic component connection pad 17 is formed on the upper surface of the upper clad layer 16c. The connection conductor 18a and the electronic component connection pad 17 are formed of a highly conductive metal such as copper, for example, by the well-known plating method.

Figure 2I:
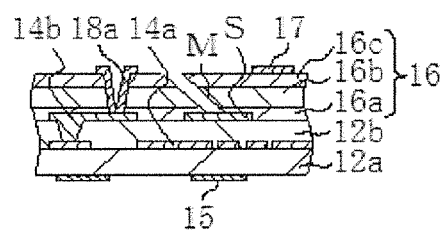
Figure 3:
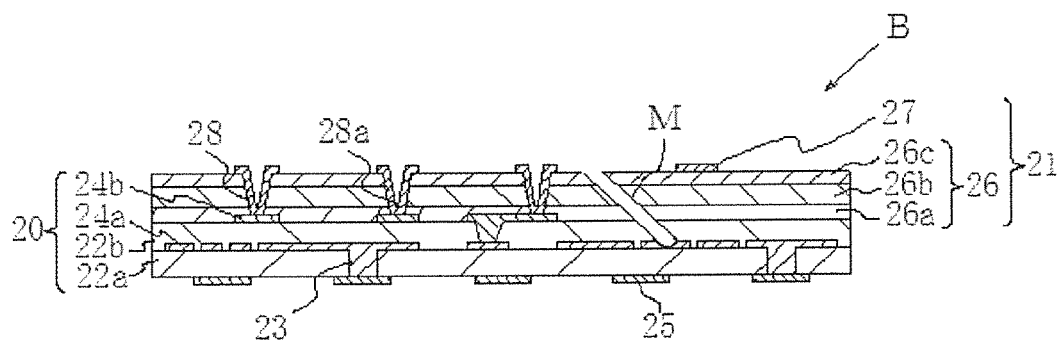
FIG. 3 is a schematic cross-sectional view showing an optical circuit board formed by the conventional producing method.
Figure 4A:
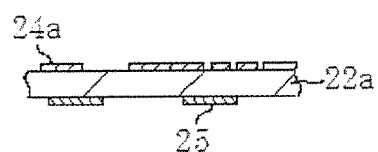
FIGS. 4A to 4I are principal part enlarged cross-sectional views showing the method for producing the conventional optical circuit board.
Figure 4B:
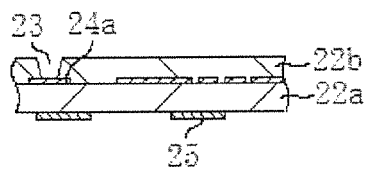
Figure 4C:
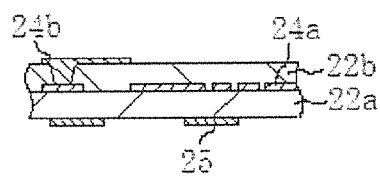
Figure 4D:
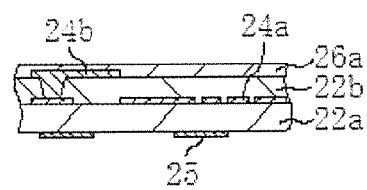
Figure 4E:
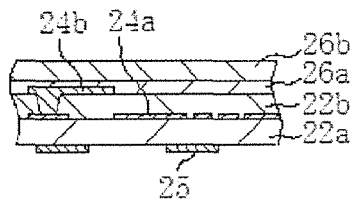
Figure 4F:
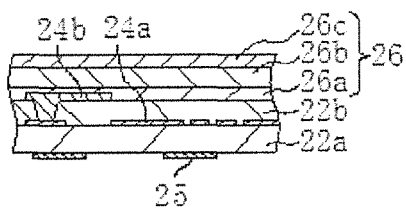
Figure 4G:
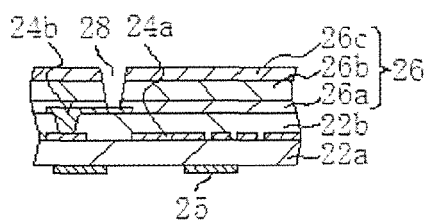
Figure 4H:
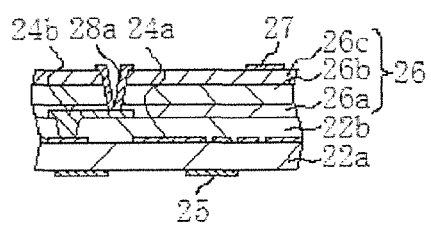
Figure 4I:
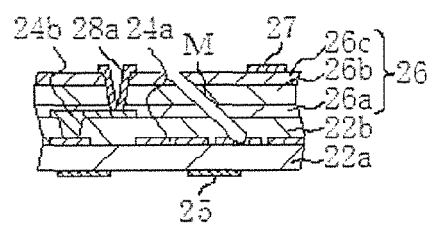

Lastly, as shown in FIG. 2I, a laser beam is irradiated obliquely from above the optical waveguide 16 to divide the core 16b, and the reflection surface M including an inner surface of a groove being perpendicular to the extending direction of the core 16b and having a predetermined angle with respect to the upper surface of the wiring board 10 is formed. The surface treatment with blasting and the like is performed on the divided surface of the optical waveguide 16 divided by the laser beam, which is the inner surface of the groove, whereby the optical circuit board A as shown in FIG. 1A is formed.

According to the optical circuit board of the present embodiment, the metal layer S is disposed on an upper surface of the insulating layer 12b on the upper side than the wiring conductor of the wiring board, and set as a bottom surface of the groove is formed. That is, the metal layer S for the laser beam cutoff is formed in a region where the irradiating axis of the laser beam for forming the reflection surface M and the upper surface of the upper insulating layer 12b intersect. Therefore, the laser beam irradiated when the reflection surface M is formed divides the core 16b, and subsequently is prevented from reaching the lower side of the metal layer S by the metal layer S for the laser beam cutoff. Thus, the lower-layer wiring conductor 14a can avoid being damaged by the laser beam, and therefore it is possible to provide a high reliable optical circuit board capable of stably propagating the electrical signal to the lower-layer wiring conductor 14a and of stably operating the electronic component.

The present invention is not intended to be limited to the embodiment described above, and various modifications and improvements are possible within the scope of the claims. For example, although the case where the metal layer S is formed of copper is described, the metal layer S may be formed of a metal such as titanium, nickel, or chromium, or an alloy layer of these.

What is claimed is:

1. A method for producing an optical circuit board, the method comprising:
    preparing a wiring board comprising a lower insulating layer on the upper surface of which a lower-layer wiring conductor is deposited by a plating method, and an upper insulating layer on the upper surface of which an upper-layer wiring conductor is deposited by a plating method, and which is laminated on an upper surface of the lower insulating layer;
    disposing an optical waveguide on an upper surface of the wiring board, and the optical waveguide comprising a lower clad layer, an upper clad layer and a core sandwiched between the lower clad layer and the upper clad layer; and
    irradiating a laser beam obliquely from above the optical waveguide to divide the core, thereby forming a reflection surface to the core;
    wherein in preparing the wiring board, a metal layer comprising copper and having a thickness of 10 to 15 µm is formed, simultaneously with the wiring conductor by the plating method, in a region where an irradiating axis of the laser beam and an upper surface of the upper insulating layer intersect, thereby preventing the laser beam from reaching below the upper insulating layer.

2. The method for producing an optical circuit board according to claim 1, further comprising disposing a connection hole in the optical waveguide, the connection hole including a connection conductor electrically connected to the upper layer wiring conductor.

* * * * *